(12) United States Patent
Kondo et al.

(10) Patent No.: US 11,084,484 B2
(45) Date of Patent: Aug. 10, 2021

(54) HYBRID VEHICLE CONTROL METHOD AND CONTROL DEVICE

(71) Applicant: Nissan Motor Co., Ltd., Yokohama (JP)

(72) Inventors: Shinpei Kondo, Kanagawa (JP); Yusuke Ienaka, Kanagawa (JP); Hirotaka Kaneko, Kanagawa (JP); Tomohiro Ito, Kanagawa (JP); Yuusuke Satou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 410 days.

(21) Appl. No.: 16/328,747

(22) PCT Filed: Sep. 6, 2016

(86) PCT No.: PCT/JP2016/076133
§ 371 (c)(1),
(2) Date: Feb. 27, 2019

(87) PCT Pub. No.: WO2018/047224
PCT Pub. Date: Mar. 15, 2018

(65) Prior Publication Data
US 2019/0184975 A1    Jun. 20, 2019

(51) Int. Cl.
*B60W 20/17* (2016.01)
*B60W 10/08* (2006.01)
(Continued)

(52) U.S. Cl.
CPC ............. *B60W 20/17* (2016.01); *B60K 6/44* (2013.01); *B60W 10/06* (2013.01); *B60W 10/08* (2013.01);
(Continued)

(58) Field of Classification Search
CPC ...... B60W 20/17; B60W 30/20; B60W 10/06; B60W 10/10; B60W 10/08; B60K 6/44
See application file for complete search history.

(56) References Cited

U.S. PATENT DOCUMENTS

| | | | | |
|---|---|---|---|---|
| 2004/0093127 A1* | 5/2004 | Onoyama | ........... | F02N 11/0825 701/1 |
| 2007/0162200 A1* | 7/2007 | Zillmer | ................. | B60W 20/15 701/22 |

(Continued)

FOREIGN PATENT DOCUMENTS

| | | |
|---|---|---|
| JP | 9-277854 A | 10/1997 |
| JP | 2004-169692 A | 6/2004 |

(Continued)

*Primary Examiner* — Donald J Wallace
(74) *Attorney, Agent, or Firm* — Global IP Counselors, LLP

(57) ABSTRACT

A hybrid vehicle control method is provided for a hybrid vehicle having an engine and a generator directly connected via a gear train having a plurality of gears that are engaged with each other. In this hybrid vehicle control method, a prescribed torque is continuously applied to the generator upon determining the engine is in a rotating state such that a transmission torque of the gear train does not continuously fluctuate above and below zero torque. Preferably, in one embodiment, the prescribed torque continuously applied to the second motor/generator is a negative torque value during a power generation operation in which the generator is rotated by the engine and is a positive torque value during a motoring operation in which the engine is rotated by the generator.

6 Claims, 5 Drawing Sheets

(51) Int. Cl.
  *B60W 30/20* (2006.01)
  *B60K 6/44* (2007.10)
  *B60W 10/06* (2006.01)
  *B60W 10/10* (2012.01)
  *B60W 20/20* (2016.01)

(52) U.S. Cl.
  CPC ............ *B60W 10/10* (2013.01); *B60W 30/20* (2013.01); *B60W 20/20* (2013.01); *B60W 2510/244* (2013.01); *B60W 2555/20* (2020.02); *B60W 2720/40* (2013.01); *B60Y 2300/74* (2013.01); *Y02T 10/62* (2013.01)

(56) References Cited

U.S. PATENT DOCUMENTS

| | | | |
|---|---|---|---|
| 2008/0305923 A1* | 12/2008 | Tabata | B60W 20/00 477/3 |
| 2013/0134778 A1* | 5/2013 | Tamanaha | H02J 7/04 307/10.1 |
| 2015/0204254 A1* | 7/2015 | Kageyama | F02D 41/0215 701/110 |

FOREIGN PATENT DOCUMENTS

| | | |
|---|---|---|
| JP | 2013-185599 A | 9/2013 |
| JP | 2014-101766 A | 6/2014 |
| JP | 2016-7884 A | 1/2016 |
| JP | 2016-120751 A | 7/2016 |

\* cited by examiner

HYBRID VEHICLE CONTROL METHOD AND CONTROL DEVICE

CROSS-REFERENCE TO RELATED APPLICATIONS

This application is a U.S. national stage application of International Application No. PCT/JP2016/076133, filed on Sep. 6, 2016.

BACKGROUND

Technical Field

The present disclosure relates to a control method and a control device for a hybrid vehicle in which an engine and a generator are directly connected via a gear train comprising a plurality of gears that are engaged with each other.

Background Information

Conventionally, a device in which an engine and a generator are directly connected via a gear train comprising a plurality of gears that are engaged with each other has been disclosed (for example, Japanese Laid Open Patent Application No. 2013-185599 refer to as Patent Document 1).

SUMMARY

However, in the conventional device, for example during a power generation operation in which power generation torque is kept low, transmission torque of the gear train directly connecting the engine and the generator fluctuates continuously above and below zero torque. Consequently, there is a problem in that the tooth surfaces of mutually engaged gears collide with each other and generate a continuous teeth striking noise called "rattle."

In view of the problem described above an object of the present disclosure is to prevent the continuous teeth striking noise generated in the gear train when the engine is in a rotating state.

In order to achieve the object described above, in the present disclosure an engine and a generator are directly connected via a gear train comprising a plurality of gears that are engaged with each other. In this control method for a hybrid vehicle, when the engine is in a rotating state a prescribed torque is continuously applied to the generator such that the transmission torque of the gear train does not continuously fluctuate above and below zero torque.

Thus, by controlling the generator torque and thereby managing the gear transmission torque it is possible to prevent the continuous teeth striking noise generated in the gear train when the engine is in the rotating state.

DETAILED DESCRIPTION OF THE EMBODIMENTS

Figure 1:
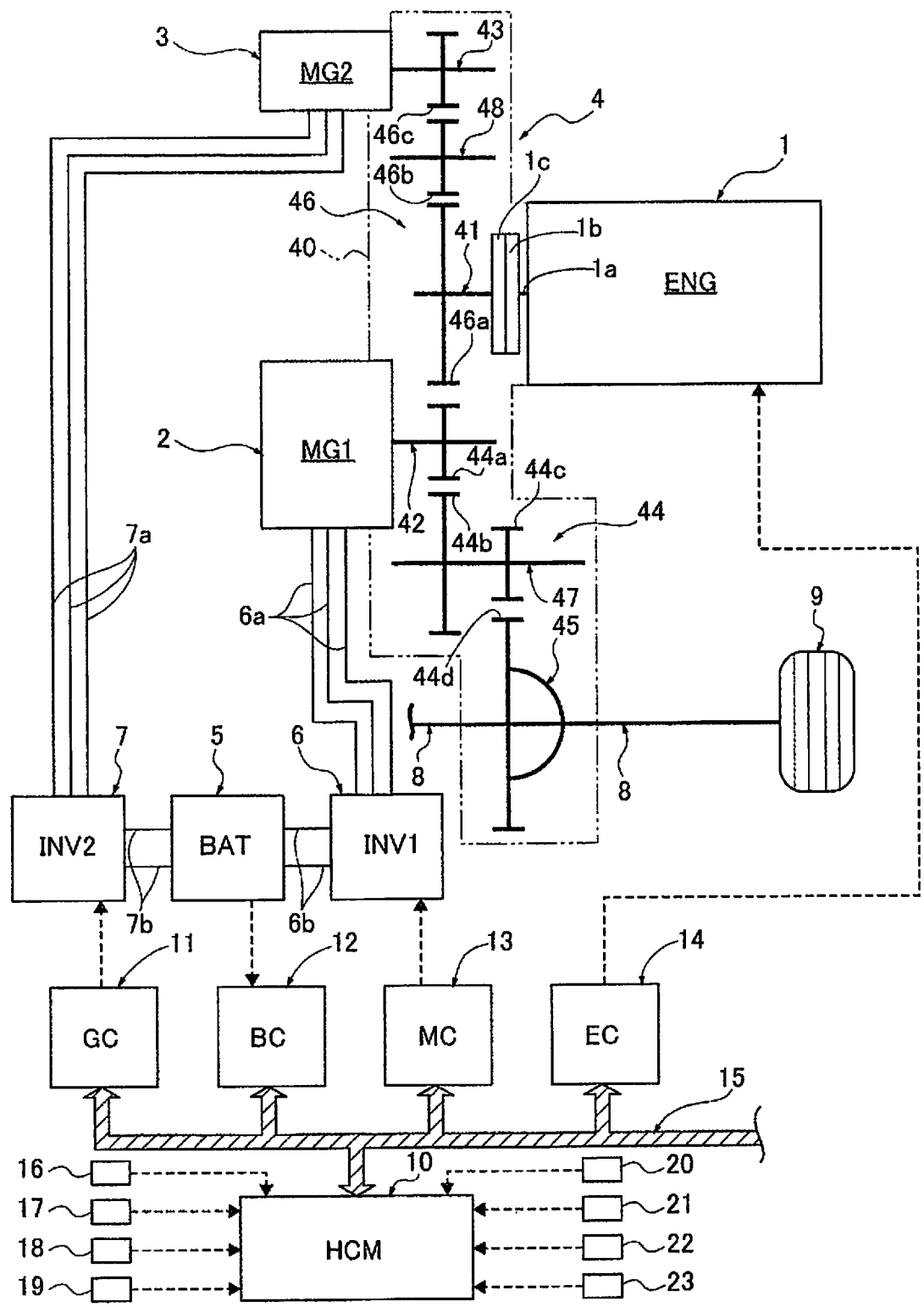
FIG. 1 is an overall system view illustrating a drive system and a control system of a series hybrid vehicle (one example of a hybrid vehicle) to which is applied a control method and a control device according to a first embodiment.

A preferred embodiment for achieving a control method and a control device for a hybrid vehicle according to the present disclosure will be described below, based on a first embodiment illustrated in the drawings.

First Embodiment

The configuration will be described first. The control method and the control device for a hybrid vehicle according to the first embodiment are applied to a series hybrid vehicle in which it is possible to charge a battery externally and in which an engine is stopped and EV traveling is carried out while a charge capacity is high, and EV traveling while generating power with the engine is carried out when the charge capacity becomes low. The configuration of the first embodiment will be explained below as a separate "overall system configuration" and "configuration of the rattle prevention and engine operation control process."

Overall System Configuration

FIG. 1 illustrates a drive system and a control system of a series hybrid vehicle to which is applied a control method and a control device according to a first embodiment. The overall system configuration will be described below based on FIG. 1.

The drive system of the series hybrid vehicle comprises an engine 1 (Eng), a first motor/generator 2 (MG1), a second motor/generator 3 (MG2), and a gear box 4, as illustrated in FIG. 1. The second motor/generator 3 corresponds to a generator.

The engine 1 is, for example, a gasoline engine or a diesel engine disposed in a front compartment of a vehicle such that a crankshaft direction is in the vehicle width direction. The main body of this engine 1 is connected and fixed to a gear case 40 of the gear box 4. A crankshaft 1a of the engine 1 is connected to an engine shaft 41 of the gear box 4 via a damper 1c and a single-mass flywheel 1b. The engine 1 is started using the second motor/generator 3 as a starter motor.

The first motor/generator 2 is a three-phase alternating current permanent magnet synchronous motor having as a power source a battery 5 installed as a traveling drive source, and having a regenerative function when decelerating and braking. A stator case of the first motor/generator 2 is connected and fixed to the gear case 40 of the gear box 4. A rotor of the first motor/generator 2 is connected to a first motor shaft 42 of the gear box 4. A first inverter 6, which converts a direct current to a three-phase alternating current during power running and converts a three-phase alternating current to a direct current during regeneration, is connected to a stator coil of the first motor/generator 2 via a first AC harness 6a. The first inverter 6 and the battery 5 are connected via a first DC harness 6b.

The second motor/generator 3 is a three-phase alternating current permanent magnet synchronous motor having as a power source the battery 5 that is installed as a generator, and having a motoring operation function and a starter motor function for the engine 1. The stator case of the second motor/generator 3 is connected and fixed to the gear case 40 of the gear box 4. A rotor of the second motor/generator 3 is connected to second motor shaft 43 of the gear box 4. A second inverter 7, which converts a direct current to a three-phase alternating current during power running and converts a three-phase alternating current to a direct current during regeneration, is connected to a stator coil of the second motor/generator 3 via a second AC harness 7a. The second inverter 7 and the battery 5 are connected via a second DC harness 7b.

The gear box 4 is configured by arranging a deceleration gear train 44, a differential gear unit 45, and a gear train 46 inside a gear case 40, to which the engine 1, the first motor/generator 2, and the second motor/generator 3 are connected and fixed.

The deceleration gear train 44 is a two-stage deceleration gear train for decelerating the rotation of the first motor/generator 2 in order to increase the motor torque and secure the traveling drive torque, and includes a first motor shaft 42 and a first idler shaft 47. A first deceleration gear stage is configured by mutually engaging a first motor gear 44a provided on the first motor shaft 42 and a large-diameter idler gear 44b provided on the first idler shaft 47. A second deceleration gear stage is configured by mutually engaging a small-diameter idler gear 44c provided on the first idler shaft 47 and an output gear 44d provided on an input side of the differential gear unit 45.

The differential gear unit 45 transmits the drive torque that is input via an output gear 44d of the deceleration gear train 44 to left and right drive wheels 9, 9 (only one wheel is shown in FIG. 1) via left and right drive shafts 8, 8, while permitting differential rotation.

The gear train 46 is a gear train directly connecting the engine 1 and the second motor/generator 3 (generator) without interposing a clutch therebetween, and includes the engine shaft 41, a second idler shaft 48, and the second motor shaft 43. The gear train is configured by mutually engaging an engine gear 46a provided on the engine shaft 41, a second idler gear 46b provided on the second idler shaft 48, and a second motor gear 46c provided on the second motor shaft 43. The relationship between the numbers of gear teeth is: engine gear 46a>second motor gear 46c, and during a power generation operation the rotational speed of the engine 1 is increased, and the engine torque required for power generation is transmitted toward the second motor/generator 3 by a combustion operation (firing operation). At the time of a starter operation or a motoring operation, the rotational speed of the second motor/generator 3 is decreased, and the motor torque required for the starter operation or the motoring operation is transmitted toward the engine 1.

A control system of the series hybrid vehicle comprises a hybrid control module 10 (HCM), a generation controller 11 (GC), a battery controller 12 (BC), a motor controller 13 (MC), and an engine controller 14 (EC), as illustrated in FIG. 1. The hybrid control module 10 and the other controllers (the power generation controller 11, the battery controller 12, the motor controller 13, the engine controller 14, etc.) are connected so as to be capable of bidirectional information exchange via a CAN communication line 15. The "CAN" in CAN communication line 15 is an acronym for "Controller Area Network."

The hybrid control module 10 is an integrated control means having a function of appropriately managing the energy consumption of the entire vehicle. That is, information on a battery charge capacity (hereinafter referred to as "SOC (State of Charge)") is input from the battery controller 12 via the CAN communication line 15. In addition, information is input from an accelerator opening degree sensor 16, a vehicle speed sensor 17, an engine rotational speed sensor 18, an engine cooling water temperature sensor 19, an outside air temperature sensor 20, a door switch 21, a bonnet switch 22, ignition switch 23, and the like. Various controls are then carried out based on the input information. Among these controls, a control that is carried out for the purpose of running a series hybrid vehicle capable of being charged externally at a high fuel efficiency is a control for selecting the traveling mode ("CD mode," "CS mode") based on the SOC of the battery 5. In addition, the rattle prevention and engine operation control of the first embodiment, described further below, is a control that is executed mainly when the above-described CD mode is selected and the SOC of the battery 5 is in a high region, and is based not on a battery charging request but on an engine combustion request.

In principle the "CD mode (Charge Depleting mode)" is a mode that prioritizes EV traveling, which consumes the electric power of the battery 5, and is selected, for example, while the SOC of the battery 5 is decreasing from a full SOC to a set SOC. In principle the "CS mode (Charge Sustain Mode)" is a mode that that prioritizes traveling that maintains the electric power of the battery 5 by the power generation operation of the engine 1, and is selected when the SOC of the battery 5 becomes less than or equal to a set SOC. The "set SOC," which is the mode switching threshold, is provided with hysteresis between the value when switching from the CD mode to the CS mode and the value when switching from the CS mode to the CD mode.

The generation controller 11 is configured to carry out power running control, regenerative control, and the like of the second motor/generator 3 in accordance with a rotational speed control command and a torque control command issued to the second inverter 7. The battery controller 12 is configured to manage the battery temperature, the SOC of the battery 5, and the like. The motor controller 13 is configured to carry out the power running control, the regenerative control, and the like of the first motor/generator 2 in accordance with a torque control command and a rotational speed control command issued to the first inverter 6. The engine controller 14 is configured to carry out start control of the engine 1, a stop control of the engine 1, a fuel cut control, and the like.

[Configuration of the Rattle Prevention and Engine Operation Control Process]

Figure 2:
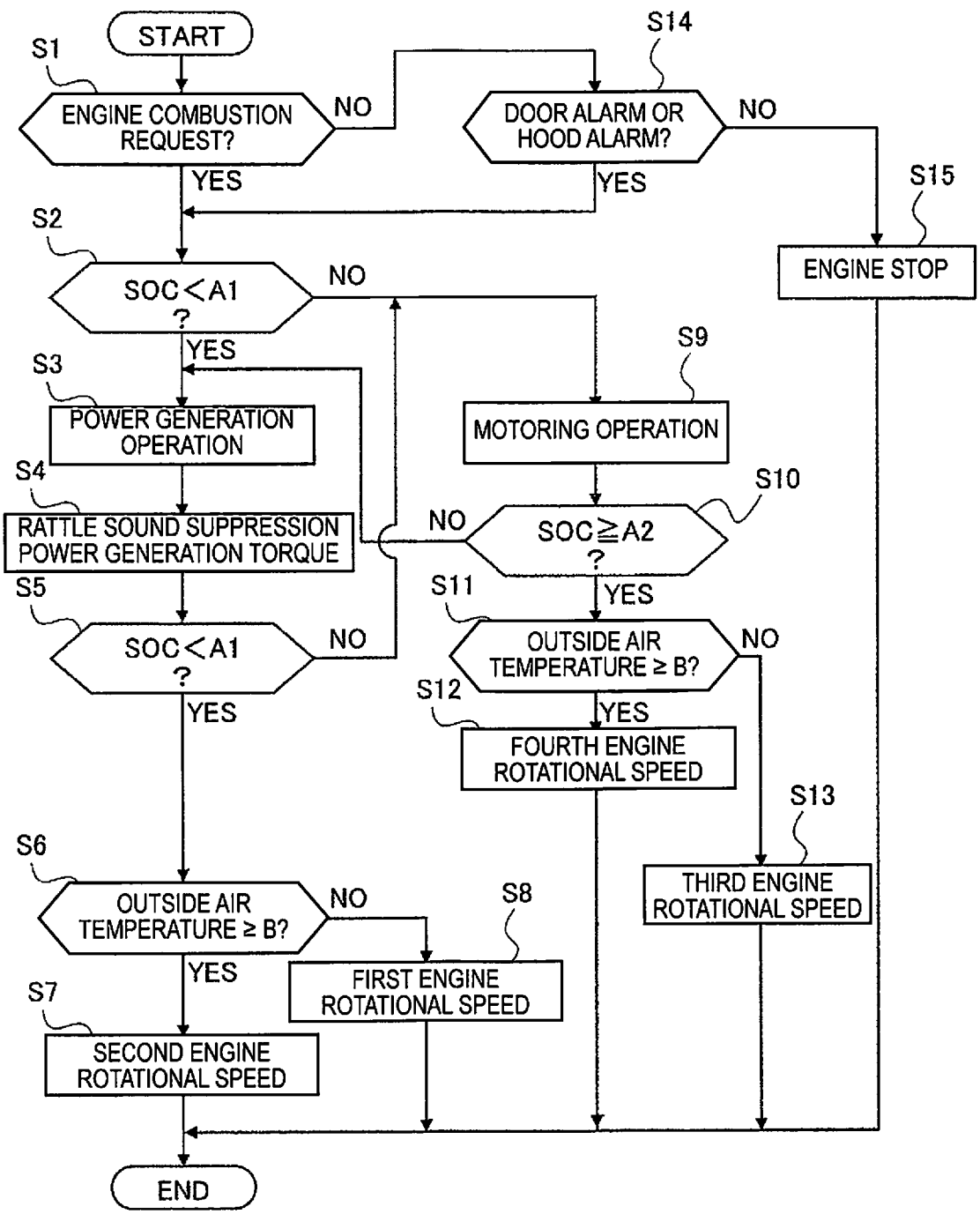
FIG. 2 is a flowchart illustrating a flow of a rattle prevention and engine operation control process executed in a hybrid control module of a series hybrid vehicle.

FIG. 2 is a flowchart showing a flow of the rattle prevention and engine operation control process executed in the hybrid control module 10 of the first embodiment. Each step in FIG. 2 shows the configuration of the rattle prevention and engine operation control process that will be described below. The flowchart in FIG. 2 is repeatedly executed every prescribed control cycle.

In Step S1 it is determined whether there is an engine combustion request. If YES (engine combustion request), then the process proceeds to Step S2, and if NO (no engine combustion request), then the process proceeds to Step S14. An "engine combustion request" is not a battery charge request, but is issued, when the engine cooling water temperature is less than or equal to a set temperature (e.g.: 20° C.), during EGVR (catalyst warm-up mode), or when there is a heating request (A/C ON at a low outside temperature), for example.

In Step S2, following the determination in Step S1 that there is an engine combustion request or the determination in Step S14 that there is a door alarm or a hood alarm, then it is determined whether the SOC is less than a power generation stop threshold A1. If YES (SOC<A1), then the process proceeds to Step S3, and if NO (SOC≥A1), then the process proceeds to Step S9. The "power generation stop threshold A1" is set to a value that is in a full charge region, but that is in an upper limit region of the SOC at which a charge capacity corresponding to the regenerative charging due to deceleration traveling, etc., can be allowed (e.g.: SOC=about 90%).

In Step S3, following the determination in Step S2 that SOC<A1, the engine 1 is started to execute a power generation operation in which the second motor/generator 3 is rotationally driven to generate power by a firing rotation of the engine 1, and the generated electric power is used to charge the battery 5, after which the process proceeds to Step S4.

In Step S4, following the execution of the power generation operation in Step S3, a control is carried out in which a power generation torque (negative torque value) that is continuously applied to the second motor/generator 3 is set as a rattle sound suppression power generation torque, and the process proceeds to Step S5. The "rattle sound suppression power generation torque" is a torque value at which the transmission torque of the gear train 46 does not fluctuate continuously above and below zero torque, when taking into account a torque fluctuation amplitude of an engine shaft torque of the engine 1. That is, because the power generation torque becomes the transmission torque of the gear train 46, if the power generation torque request is zero torque or close to zero torque the absolute value of the power generation torque is raised to a minimum torque value.

In Step S5, following the control of setting the rattle sound suppression power generation torque in Step S4, it is determined whether the SOC is less than the power generation stop threshold A1, in the same manner as in Step S2. If YES (SOC<A1), then the process proceeds to Step S6, and if NO (SOC≥A1), then the process proceeds to Step S9. The SOC determination is carried out during the power generation operation in order to ensure a responsive transition from the power generation operation to the motoring operation when the SOC rises and becomes SOC≥A1 during the power generation operation.

In Step S6, following the determination in Step S5 that SOC<A1, it is determined whether the outside air temperature at that time is greater than or equal to a set temperature B. If YES (Outside air temperature≥B), then the process proceeds to Step S7, and if NO (outside air temperature<B), then the process proceeds to Step S8. The "outside air temperature at that time" is acquired from the outside air temperature sensor 20. The "set temperature B" is set to a value at which there would be a heating request from the passenger if the outside air temperature were any lower.

In Step S7, following the determination in Step S6 that outside air temperature ≥B, the target rotational speed of the engine 1 is set to a second engine rotational speed, and the process proceeds to END. If the target rotational speed of the engine 1 is set to the second engine rotational speed, then the engine target rotational speed can be achieved by controlling the rotational speed of the second motor/generator 3, which is the generator. When the motor rotational speed of the second motor/generator 3 is controlled so as to achieve the engine target rotational speed the transmission torque of the gear train 46 automatically exceeds the minimum torque value.

In Step S8, following the determination in Step S6 that outside air temperature ≥B, the target rotational speed of the engine 1 is set to a first engine rotational speed, which is a higher rotational speed than the second engine rotational speed, and the process proceeds to END. When the motor rotational speed of the second motor/generator 3 is controlled so as to achieve the engine target rotational speed as described in Step S7, the transmission torque of the gear train 46 automatically exceeds the minimum torque value.

In Step S9, following the determination in Step S2 or S5 that SOC≥A1, if the engine is being operated the engine 1 is stopped and the second motor/generator 3 is switched to the power running side. The motoring operation is then executed, in which the engine 1 is cranked and rotated by the rotational driving force from the second motor/generator 3, and the process proceeds to Step S10.

In Step S10, following the execution of the motoring operation in Step S9, it is determined whether the SOC has become greater than or equal to a power generation start threshold A2 as a result of the SOC being reduced due to the motoring operation. If YES (SOC≥A2), then the process proceeds to Step S11, and if NO (SOC<A2), then the process proceeds to Step S3. The "power generation start threshold A2" is set to a value at which the motoring operation is executed because the SOC is greater than or equal to the power generation stop threshold A1, but it is possible to return to the power generation operation with the decrease in the charge capacity during the motoring operation (e.g.: approximately 88%).

In Step S11, following the determination in Step S10 that SOC≥A2, it is determined whether the outside air temperature at that time is greater than or equal to the set temperature B, in the same manner as in Step S6. If YES (Outside air temperature≥B), then the process proceeds to Step S12, and if NO (outside air temperature<B), then the process proceeds to Step S13.

In Step S12, following the determination in Step S11 that outside air temperature≥B, the target rotational speed of the engine 1 is set to a fourth engine rotational speed, and the process proceeds to END. If the target rotational speed of the engine 1 is set to the fourth engine rotational speed, then the engine target rotational speed can be achieved by controlling the rotational speed of the second motor/generator 3, which is the generator. When the motor rotational speed of the second motor/generator 3 is controlled so as to achieve the engine target rotational speed the transmission torque of the gear train 46 automatically exceeds the minimum torque value.

In Step S13, following the determination in Step S11 that outside air temperature ≥B, the target rotational speed of the engine 1 is set to a third engine rotational speed, which is a higher rotational speed than the fourth engine rotational speed, and the process proceeds to END. When the motor rotational speed of the second motor/generator 3 is controlled so as to achieve the engine target rotational speed, as described in Step S12, the transmission torque of the gear train 46 automatically exceeds the minimum torque value.

In Step S14, following the determination in Step S1 that there is no engine combustion request, it is determined whether there is a door alarm or a hood alarm. If YES (there is a door alarm or a hood alarm), then the process proceeds to Step S2, and if NO (there is no door alarm or hood alarm), then the process proceeds to Step S15. The "door alarm" means attempting to exit the vehicle while the vehicle door remains open, which is determined by switch signals from the door switch 21 and the ignition switch 23. "Hood alarm" means attempting to exit the vehicle while an engine hood or a trunk hood remains open, which is determined by switch signals from the bonnet switch 22 and the ignition switch 23.

In Step S15, the engine 1 is stopped following the determination in Step S14 that there is no door alarm or hood alarm, and then the process proceeds to END. That is, when there is no engine combustion request and there is no door alarm or hood alarm, a control is executed for selecting between the "CD mode" and the "CS mode" based on the SOC of the battery 5.

The relationship between the first engine rotational speed and the second engine rotational speed in the power generation operation, and the third engine rotational speed and the fourth engine rotational speed in the motoring operation, is set as follows. When the power generation operation and the motoring operation are repeated and a vehicle has a specification in which it is desired to equalize the engine noise, the relationship is set to (third engine rotational speed and fourth engine rotational speed: motoring rotational speed)>(first engine rotational speed and second engine rotational speed: firing rotational speed) (refer to FIG. 6). When the power generation operation and the motoring operation are repeated and a vehicle has a specification in which it is desired to equalize the booming noise outside the vehicle, the relationship is set to (third engine rotational speed and fourth engine rotational speed: motoring rotational speed)<(first engine rotational speed and second engine rotational speed: firing rotational speed) (refer to FIG. 7).

The actions will be described next. The actions of the first embodiment will be described separately below as "Action of the rattle prevention and engine operation control process," "background art of rattle prevention," "characteristic action of the rattle prevention control," and "characteristic action of the engine operation control."

Action of the Rattle Prevention and Engine Operation Control Process

The action of the rattle prevention and engine operation control process will be described below based on the flowchart in FIG. 2.

For example, immediately after ignition ON, if the engine cooling water temperature is low and there is an engine combustion request, SOC≥A1, and the outside air temperature<B, then the process proceeds from Step S1→Step S2→Step S9→Step S10→Step S11→Step S13→END in the flowchart in FIG. 2. In Step S9, the motoring operation is executed in which the engine 1 is cranked and rotated by the rotational driving force from the second motor/generator 3. In Step S13, the target rotational speed of the engine 1 is set to the third engine rotational speed, which is a higher rotational speed than the fourth engine rotational speed, and the motor rotational speed of the second motor/generator 3 is controlled.

Then, when the SOC of the battery 5 decreases due to the execution of the motoring operation and SOC<A2 is satisfied, the process proceeds from Step S10 to Step S3→Step S4→Step S5→Step S6→Step S8→END, in the flowchart in FIG. 2. In Step S3, the engine 1 is started to execute the power generation operation in which the second motor/generator 3 is rotationally driven to generate power by the firing rotation of the engine 1, and the generated electric power is used to charge the battery 5. In the subsequent Step S4, a control is carried out in which the power generation torque (negative torque value) that is continuously applied to the second motor/generator 3 is set as the rattle sound suppression power generation torque. In Step S8, the target rotational speed of the engine 1 is set to the first engine rotational speed, which is a higher rotational speed than the second engine rotational speed, and the motor rotational speed of the second motor/generator 3 is controlled.

Then, when the SOC of the battery 5 increases due to the execution of the power generation operation and SOC≥A1 is satisfied, the process proceeds from Step S2 or Step S5 to Step S9→Step S10→Step S11→Step S13→END, in the flowchart in FIG. 2. That is, the operation is switched to the motoring operation again. Similarly, when the SOC of the battery 5 decreases due to the execution of the motoring operation and SOC<A2 is satisfied, the process proceeds from Step S10 to Step S3→Step S4→Step S5→Step S6→Step S8→END, in the flowchart in FIG. 2. That is, the operation is switched to the power generation operation again.

Thus, while there is an engine combustion request, the motoring operation and the power generation operation are repeatedly executed in accordance with the changes in the SOC. At this time, if outside air temperature<B, the target rotational speed of the engine 1 is set to the third engine rotational speed (motoring operation) and the first engine rotational speed (power generation operation), and the motor rotational speed of the second motor/generator 3 is controlled. If outside air temperature≥B, the target rotational speed of the engine 1 is set to the fourth engine rotational speed (motoring operation) and the second engine rotational speed (power generation operation), and the motor rotational speed of the second motor/generator 3 is controlled.

However, when it is determined that there is no engine combustion request but there is a door alarm or a hood alarm, the process proceeds from Step S1→Step S14→Step S2 and onward in the flowchart in FIG. 2. That is, the motoring operation and the power generation operation are repeatedly executed in accordance with the changes in the SOC, in the same manner as when there is an engine combustion request. When it is determined that there is no engine combustion request and there is no door alarm or hood alarm, the process proceeds from Step S1→Step S14→Step S15 END in the flowchart in FIG. 2. In Step S15, the engine 1 is stopped and a control for selecting between the "CD mode" and the "CS mode" is executed based on the SOC of the battery 5.

Thus, when the engine cooling water temperature is low, during EGVR, when there is a heating request, or the like, and when an engine combustion request occurs the power generation stop threshold A1 and the power generation start threshold A2 of the SOC are used to repeatedly execute the motoring operation and the power generation operation. The power generation operation at this time is not based on the battery charge request, so even though the power generation torque becomes zero torque or a low value close to zero torque, the power generation torque becomes a torque at which the rattle sound is suppressed (negative torque). For the motoring operation as well, the drive torque becomes one at which the rattle sound is suppressed (positive torque).

Background Art of Rattle Prevention

Figure 3:
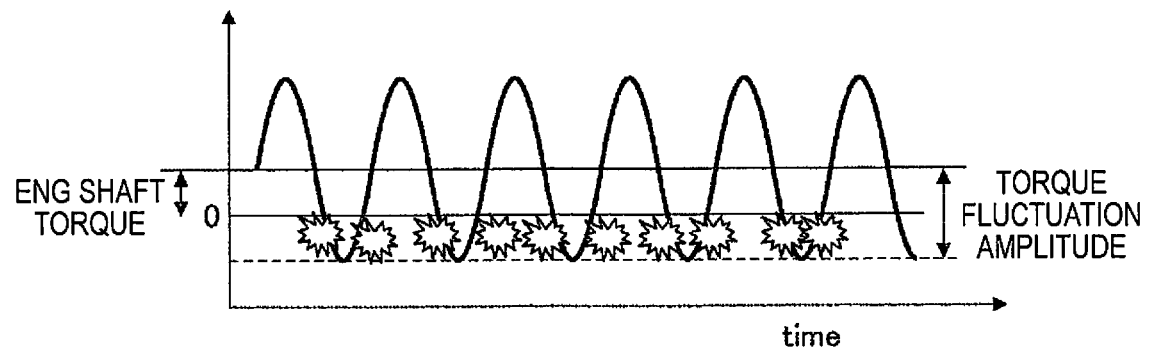
FIG. 3 is a gear transmission torque characteristic diagram illustrating a condition under which rattle occurs in a gear train directly connecting an engine and a generator.

When the ignition is ON, the engine cooling water temperature is low, or there is a heating request or the like, even if there is an engine combustion request, in the case of the series hybrid vehicle the SOC of the battery is in the full charge capacity region due to plug-in charging carried out while parked. Therefore, when the engine is combustion-operated the power generation torque to the generator must be set to zero or a low value close to zero. Accordingly, during the power generation operation in which the power generation torque (=engine shaft torque) is kept low the transmission torque of the gear train directly connecting the engine and the generator fluctuates continuously above and below zero torque, as illustrated in FIG. 3. Accordingly, the torque transmission direction of the gear train is repeatedly switched between a positive direction and a reverse direction, and the tooth surfaces of mutually engaged gears collide with each other in the gear train and generate a continuous teeth striking noise called "rattle". That is, as is obvious from FIG. 3, the condition under which the rattle is generated is one in which the torque fluctuation amplitude of the engine itself is larger than that of the engine shaft torque provided by the power generation torque. That is, if the engine shaft torque is T and the torque fluctuation amplitude is $1 \cdot d^2\theta$ ($d^2\theta$: angular acceleration), $T<1 \cdot d^2\theta$ becomes the condition under which the rattle is generated.

As measures for preventing this rattle, the following have been proposed as measures for suppressing the fluctuation range of the transmission torque of the gear train:

(a) reduction in the torque fluctuation amplitude using a dual flywheel (dual-mass flywheel).

(b) addition of tooth collision suppression torque by adding a sub-gear to the teeth colliding gear.

(c) reduction in the torque fluctuation amplitude by means of a low-rigidity damper.

However, in the case (a) of the dual flywheel, two plates, and an annular coil spring for connecting the two plates so as to be relatively rotatable are provided, which requires space and causes a layout problem. Moreover, the weight becomes large. In the case (b) of the sub-gear, space for adding the sub-gear is necessary, so there is a layout problem. Moreover, there is sub-gear noise as a result of rebounding performance. In the case (c) of the low-rigidity damper, there is the problem of increased cost.

Furthermore, there is a measure in which a clutch is interposed between the engine and the gear train, and the clutch is disengaged, and the engine only is operated with no load when there is an engine combustion request. However, since a clutch space is also necessary in this case of interposing a clutch, there is a layout problem, the weight becomes large, and there is the problem of increased cost.

Characteristic Action of the Rattle Prevention Control

In the first embodiment, in the control method for a series hybrid vehicle, when the engine 1 is in the rotating state a prescribed torque is continuously applied to the second motor/generator 3 such that the transmission torque of the gear train 46 does not continuously fluctuate above and below zero torque.

Figure 4:
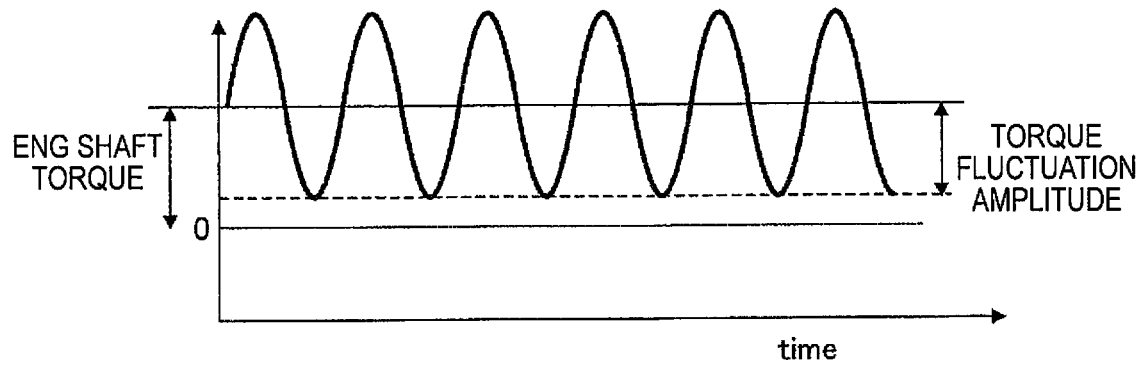
FIG. 4 is a gear transmission torque characteristic diagram illustrating a condition under which rattle does not occur in the gear train directly connecting the engine and the generator.

That is, the engine shaft torque is increased by increasing the torque to the second motor/generator 3, which becomes a load for the engine 1. Therefore, even if there is torque fluctuation amplitude in the torque characteristic of the engine 1, as illustrated in FIG. 4, the transmission torque of the gear train 46 does not continuously fluctuate above and below zero torque, and the torque transmission direction of the gear train 46 is prescribed as being either the positive direction or the reverse direction. Therefore, the contact tooth surfaces of the mutually engaging gears 46a, 46b, 46c are determined by the torque transmission direction in the gear train 46, and the continuous teeth striking noise called "rattle" will not be generated. Thus, by managing the gear transmission torque by controlling the torque of the second motor/generator 3, it is possible to prevent the continuous teeth striking noise (rattle) generated in the gear train 46 when the engine 1 is in the rotating state. In addition, since a dual flywheel, a sub-gear, a low-rigidity damper, and a clutch are not used, it is possible to achieve a reduction in the unit size, a reduction in the weight, and a reduction in the cost.

In the first embodiment the prescribed torque continuously applied to the second motor/generator 3 is a torque value at which the transmission torque of the gear train 46 does not fluctuate continuously above and below zero torque, when taking into account the torque fluctuation amplitude of the engine shaft torque of the engine 1.

That is, if the engine shaft torque is T and the torque fluctuation amplitude is $1 \cdot d^2\theta$ ($d^2\theta$: angular acceleration), it is configured to satisfy $T>1 \cdot d^2\theta$, which is the condition under which the rattle is not generated, as illustrated in FIG. 4. Moreover, the engine shaft torque T is prevented from deviating from the torque fluctuation amplitude $1 \cdot d^2\theta$, while satisfying $T>1 \cdot d^2\theta$. Accordingly, for example, the power generation torque for increasing the charge capacity of the battery 5 does not become unnecessarily high. Thus, by taking into account the torque fluctuation amplitude of the engine shaft torque of the engine 1 it is possible to reliably prevent the continuous teeth striking noise (rattle) generated in the gear train 46, without unnecessarily increasing the torque applied to the second motor/generator 3.

In the first embodiment the prescribed torque continuously applied to the second motor/generator 3 is a negative torque value during the power generation operation in which the second motor/generator 3 is rotated by the engine 1. The prescribed torque is a positive torque value during the motoring operation in which the engine 1 is rotated by the second motor/generator 3.

That is, the target for managing the gear transmission torque in the gear train 46 is not limited to the power generation operation when the engine 1 rotates the second motor/generator 3, but also includes the motoring operation when the second motor/generator 3 rotates the engine 1. Therefore, it is possible to prevent the continuous teeth striking noise (rattle) generated in the gear train 46 in both the power generation operation and the motoring operation scenarios.

Characteristic Action of the Engine Operation Control

In the first embodiment, when there is a combustion request for the engine 1 and the SOC of the battery 5 is greater than or equal to the power generation stop threshold A1, the motoring operation is executed. When the SOC of the battery 5 becomes less than the power generation start threshold A2 during execution of the motoring operation, the operation transitions to the power generation operation.

Figure 5:
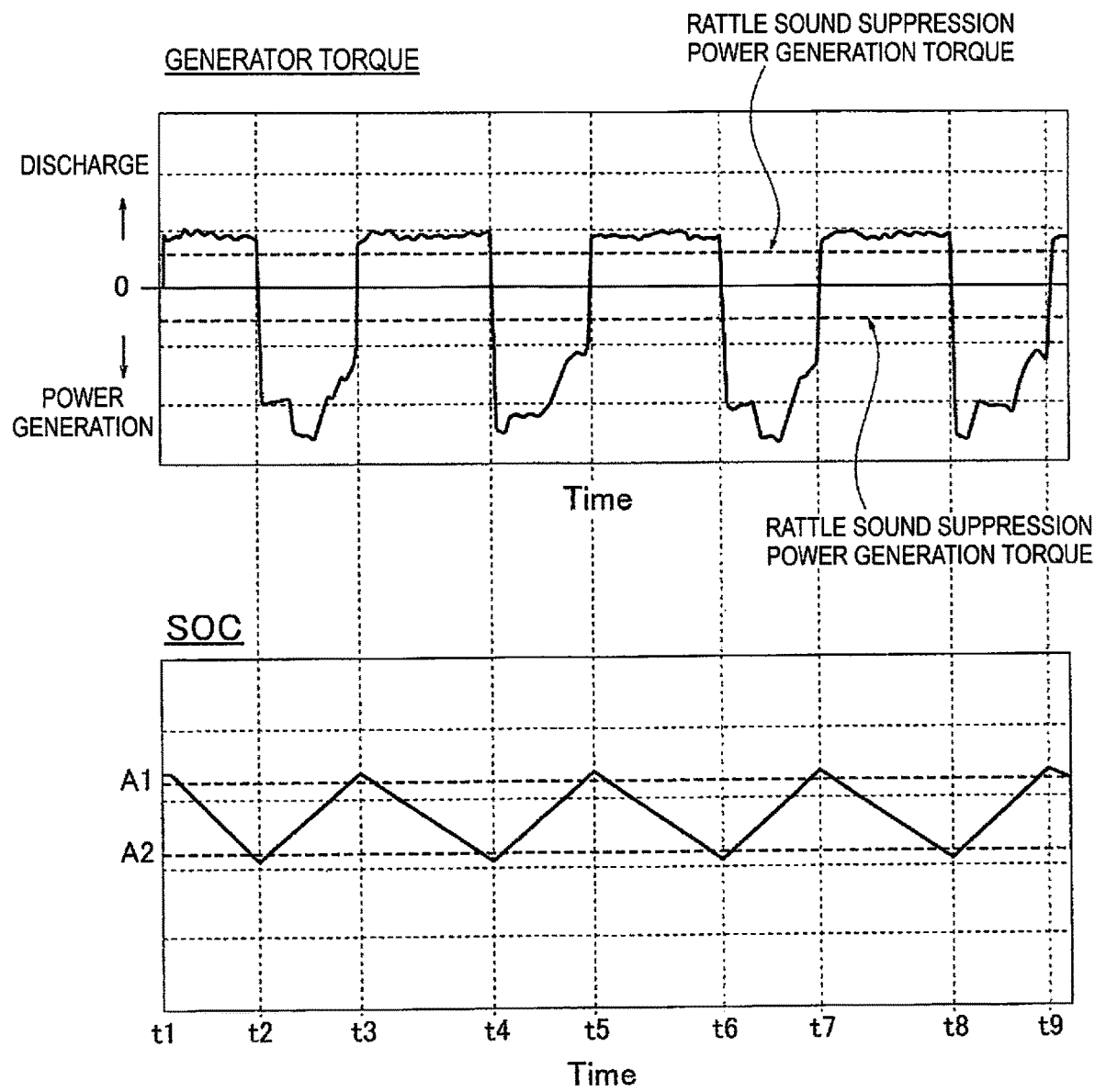
FIG. 5 is a generator torque characteristic and SOC characteristic diagram showing a situation in which a power generation operation and a motoring operation are repeated.

That is, when there is the combustion request for the engine 1 at time t1, the SOC of the battery 5 is greater than or equal to the power generation stop threshold A1, so the motoring operation is executed, as illustrated in FIG. 5. When the SOC of the battery 5 becomes less than the power generation start threshold A2 at time t2 during execution of the motoring operation, the operation transitions to the power generation operation. Thereafter, similar operations are repeated, such that motoring operation is carried out at times t1-t2, t3-t4, t5-t6, and t7-t8, power generation operation is carried out at time t2-t3, t4-t5, t6-t7, and t8-t9, thereby repeating the motoring operation and the power generation operation. Thus, by adding the motoring operation, which decreases the SOC of the battery 5, it is possible to ensure the power generation operation in response to the combustion request for the engine 1 when there is the combustion request for the engine 1, even if the SOC of the battery 5 is greater than or equal to the power generation stop threshold A1. By repeating the motoring operation and the power generation operation the teeth striking noise occurs only once when switching the operation, but this is different from the "rattle," which is a continuous teeth striking noise.

In the first embodiment, when there is no combustion request for the engine 1 and it is determined that the door or the hood has been left open, an engine operation control corresponding to the charge capacity (SOC) of the battery 5 is executed.

That is, in the case of a series hybrid vehicle, when the vehicle is stopped during EV traveling in which the engine 1 is stopped, there are cases in which the passenger attempts to exit the vehicle, erroneously thinking that an ignition OFF operation has been ended, due to a lack of sound. In contrast, when there is a door alarm or a hood alarm in which the door or the hood has been left open, the motoring operation can be executed even if the SOC of the battery 5 is in a fully charged state. Thus, by utilizing the engine operation control corresponding to the SOC when there is no engine combustion request, it is possible to warn the passenger that there is a door alarm or a hood alarm, by emitting an operation sound from the engine 1 at the time of a door alarm or a hood alarm when there is no engine combustion request.

In the first embodiment, when the engine 1 is in a cold state and there is a combustion request for the engine 1, the engine operation control corresponding to the SOC of the battery 5 is executed.

For example, when the engine 1 is in the cold state and there is the combustion request for the engine 1, if the power generation operation is carried out in response to the combustion request for the engine 1 when the SOC of the battery 5 is in the fully charged state, the power generation torque becomes zero or a small value close to zero, generating rattle. In contrast, when there is the combustion request for the engine 1 when the engine 1 is in the cold state, even if the SOC of the battery 5 is in the fully charged state, it is possible to first carry out the motoring operation to reduce the SOC of the battery 5, and then to transition to the power generation operation. Thus, when there is the combustion request for the engine 1 when the engine 1 is in the cold state, it is possible to carry out a heating assist operation in accordance with the combustion request for the engine 1 while preventing the generation of rattle.

In the first embodiment, when the power generation operation and the motoring operation are repeated as the charge capacity of the battery 5 rises and falls, the motoring rotational speed of the engine 1 (third and fourth engine rotational speeds) is set higher than the power generation rotational speed (first and second engine rotational speeds).

Figure 6:
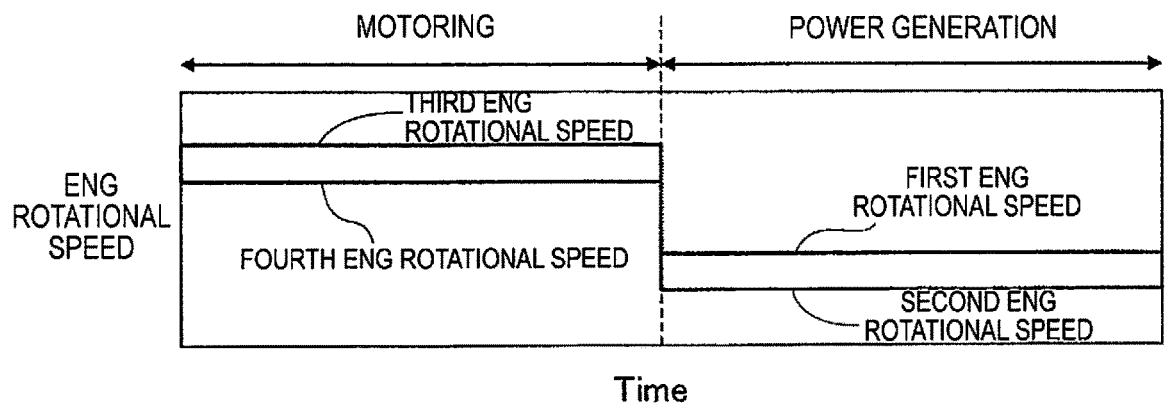
FIG. 6 is an engine rotational speed characteristic diagram illustrating the relationship between engine rotational speeds when attempting to equalize engine noise between the power generation operation and the motoring operation.

That is, the engine noise at the time of the motoring operation of the engine 1 becomes lower than the engine noise at the time of the firing operation. In contrast, by setting the motoring rotational speed of the engine 1 (third and fourth engine rotational speeds) higher than the power generation rotational speed (first and second engine rotational speeds), the difference in the levels of the engine noises can be kept small, as illustrated in FIG. 6. Accordingly, when there is an engine combustion request and the power generation operation, and the motoring operation are repeated, it is possible to keep the change in the tone of the engine noise small.

In the first embodiment, when the power generation operation and the motoring operation are repeated as the charge capacity of the battery 5 rises and falls, the motoring rotational speed of the engine 1 (third and fourth engine rotational speeds) is set lower than the power generation rotational speed (first and second engine rotational speeds).

Figure 7:
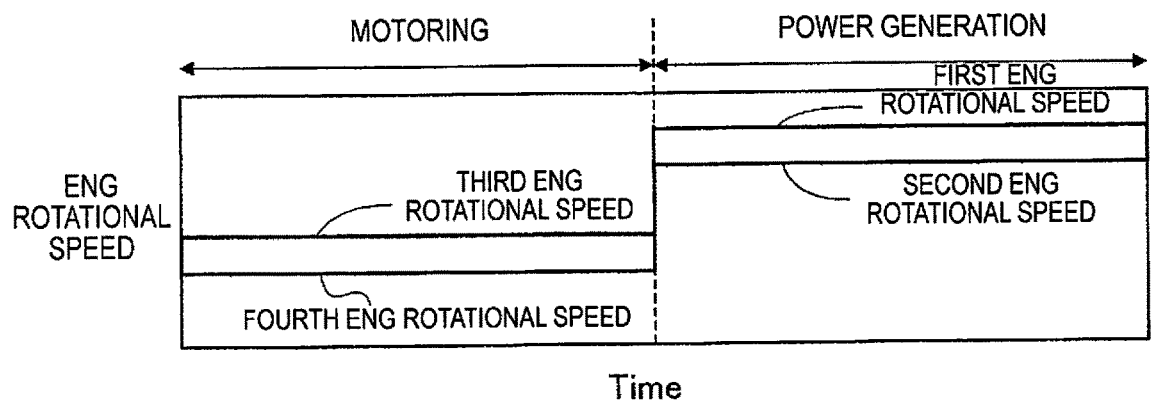
FIG. 7 is an engine rotational speed characteristic diagram illustrating the relationship between engine rotational speeds when attempting to equalize exhaust booming noise outside a vehicle between the power generation operation and the motoring operation.

That is, the exhaust booming noise outside the vehicle at the time of the motoring operation of the engine 1 becomes higher than the exhaust booming noise at the time of the firing operation. In contrast, by setting the motoring rotational speed of the engine 1 (third and fourth engine rotational speeds) lower than the power generation rotational speed (first and second engine rotational speeds), the difference in the levels of the exhaust booming noise outside the vehicle can be kept small, as illustrated in FIG. 7. Accordingly, when there is an engine combustion request and the power generation operation and the motoring operation are repeated, it is possible to keep the change in the tone of the exhaust booming noise outside the vehicle small.

In the first embodiment the power generation rotational speed and the motoring rotational speed of the engine 1 are set such that the first and third engine rotational speeds used when the outside air temperature is less than the set temperature B, are higher than the second and fourth engine rotational speeds used when the outside air temperature is greater than or equal to the set temperature B.

That is, if the outside air temperature is low at the time of the motoring operation, there is a demand to decrease the SOC of the battery 5 as quickly as possible and prepare for a heating operation by means of the firing rotation. However, if the outside air temperature is high at the time of the motoring operation, there is no demand to prepare for the heating operation, but there is the demand to decrease the exhaust booming noise as much as possible. In contrast, the first and third engine rotational speeds used when the outside air temperature is less than the set temperature B are set higher than the second and fourth engine rotational speeds when the outside air temperature is greater than or equal to the set temperature B, as illustrated in FIGS. 6 and 7. Thus, by setting the engine rotational speed giving consideration to the outside air temperature, it is possible to reduce the exhaust booming noise while responding to a heating request, when there is an engine combustion request and the power generation operation and the motoring operation are repeated.

The effects will be described next. The following effects can be obtained with the control method and the control device for series hybrid vehicle according to the first embodiment.

(1) An engine 1 and a generator (the second motor/generator 3) are directly connected via the gear train 46 comprising the plurality of gears 46a, 46b, 46c that are engaged with each other. In this control method for a series hybrid vehicle, when the engine 1 is in a rotating state, a prescribed torque is continuously applied to the generator (the second motor/generator 3) such that the transmission torque of the gear train 46 does not continuously fluctuate above and below zero torque (FIG. 4). Therefore, it is possible to provide a control method for a hybrid vehicle (series hybrid vehicle) for preventing a continuous teeth striking noise (rattle) generated in the gear train 46 when the engine 1 is in the rotating state.

(2) The prescribed torque continuously applied to the generator (the second motor/generator 3) is a torque value at which a transmission torque of the gear train 46 does not fluctuate continuously above and below zero torque, when taking into account a torque fluctuation amplitude of an engine shaft torque of the engine 1 (FIG. 4). Therefore, in addition to the effect in (1) it is possible to reliably prevent the continuous teeth striking noise (rattle) generated in the gear train 46, without unnecessarily increasing the torque that is applied to the generator (the second motor/generator 3).

(3) The prescribed torque continuously applied to the generator (the second motor/generator 3) is a negative torque value during the power generation operation in which the generator (the second motor/generator 3) is rotated by the engine 1, and is a positive torque value during the motoring operation in which the engine 1 is rotated by the generator (the second motor/generator 3) (FIG. 5). Therefore, in addition to the effect in (2) it is possible to prevent the continuous teeth striking noise (rattle) generated in the gear train 46 in both the power generation operation and the motoring operation scenarios.

(4) A battery 5 that is electrically connected to the generator (the second motor/generator 3) is provided. When there is the combustion request for the engine 1 and the charge capacity (SOC) of the battery 5 is greater than or equal to the power generation stop threshold A1, the motoring operation is executed, and when the charge capacity of the battery 5 becomes less than the power generation start threshold A2 during execution of the motoring operation, the operation transitions to the power generation operation (FIG. 2). Therefore, in addition to the effect in (3), when there is the combustion request for the engine 1, it is possible to ensure the power generation operation in response to the combustion request for the engine 1, even if the charge capacity (SOC) of the battery 5 is greater than or equal to the power generation stop threshold A1.

(5) When there is no combustion request for the engine 1 and it is determined that the door or the hood has been left open, an engine operation control in accordance with the charge capacity (SOC) of the battery 5 is executed (FIG. 2). Therefore, in addition to the effect in (4) it is possible to warn the passenger that there is a door alarm or a hood alarm, by emitting an operation sound from the engine 1 when there is a door alarm or a hood alarm and there is no engine combustion request.

(6) When the engine 1 is in a cold state and there is the combustion request for the engine 1, the engine operation control in accordance with the charge capacity (SOC) of the battery 5 is executed (FIG. 2). Therefore, in addition to the effect in (4) or (5), when the engine 1 is in the cold state and there is the combustion request for the engine 1, it is possible to carry out a heating assist operation in accordance with the combustion request for the engine 1 while preventing the generation of rattle.

(7) When the power generation operation and the motoring operation are repeated as the charge capacity of the battery 5 rises and falls, the motoring rotational speed of the engine 1 (the third and fourth engine rotational speeds) is set higher than the power generation rotational speed (the first and second engine rotational speeds) (FIG. 6). Therefore, in addition to the effects in (4) to (6), when there is an engine combustion request and the power generation operation and the motoring operation are repeated, it is possible to keep the change in the tone of the engine noise small.

(8) When the power generation operation and the motoring operation are repeated as the charge capacity of the battery 5 rises and falls, the motoring rotational speed of the engine 1 (the third and fourth engine rotational speeds) is set lower than the power generation rotational speed (first and second engine rotational speeds) (FIG. 7). Therefore, in addition to the effects in (4) to (6), when there is an engine combustion request and the power generation operation and the motoring operation are repeated, it is possible to keep the change in the tone of the exhaust booming noise outside the vehicle small.

(9) An outside air temperature sensor 20 is provided for detecting the outside air temperature. The power generation rotational speed and the motoring rotational speed of the engine 1 are set such that the rotational speeds (the first and third engine rotational speeds) used when the outside air temperature is less than the set temperature B are higher than the rotational speeds (the second and fourth engine rotational speeds) when the outside air temperature is greater than or equal to the set temperature B (FIGS. 6 and 7). Therefore, in addition to the effects in (7) and (8), when there is an engine combustion request and the power generation operation and the motoring operation are repeated it is possible to reduce the exhaust booming noise while responding to a heating request.

(10) The engine 1 and the generator (the second motor/generator 3) are directly connected via the gear train 46 having a plurality of gears (the gears 46a, 46b, 46c) that engage each other. In this control device for a hybrid vehicle (series hybrid vehicle), a controller (the hybrid control module 10) is provided for controlling a requested torque of the generator (the second motor/generator 3). When the engine 1 is in a rotating state, the controller (the hybrid control module 10) continuously applies a prescribed torque to the generator the (second motor/generator 3) such that the transmission torque of the gear train 46 does not continuously fluctuate above and below zero torque (FIG. 1). Therefore, it is possible to provide a control method for a hybrid vehicle (series hybrid vehicle) for preventing a continuous teeth striking noise (rattle) generated in the gear train 46, when the engine 1 is in the rotating state.

The control method and the control device for a hybrid vehicle according to the present disclosure have been described above based on the first embodiment. However, specific configurations are not limited to this first embodiment, and various modifications and additions to the design can be made without departing from the scope of the invention according to each of the claims.

In the first embodiment an example was shown in which, for a vehicle having a specification in which it is desired to equalize the engine noise, the relationship is set to motoring rotational speed >firing rotational speed, and for a vehicle having a specification in which it is desired to equalize the booming noise outside the vehicle, the relationship is set to motoring rotational speed <firing rotational speed. However, the two specifications described above may be selected in accordance with the passenger's preference by means of a switch or the like inside the cabin interior, or, the two specifications may be automatically switched in accordance with the vehicle state or the traveling state.

In the first embodiment an example was shown in which the control method and the control device of the present disclosure are applied to a series hybrid vehicle. However, the control method and the control device of the present disclosure may be applied to a parallel hybrid vehicle or applied to a hybrid vehicle that combines series and parallel. In short, application can be made to any control method and control device for a hybrid vehicle in which an engine and a generator are directly connected via a gear train comprising a plurality of gears that are engaged with each other.

The invention claimed is:

1. A hybrid vehicle control method for a hybrid vehicle in which a first motor/generator provided as a travel drive source is connected to a drive wheel via a deceleration gear train, and in which an engine and a second motor/generator are directly connected via a gear train having a plurality of gears that are engaged with each other, and in which a battery electrically is connected to the first motor/generator and the second motor/generator, and in which an outside air temperature sensor is configured to detect an outside air temperature, the hybrid vehicle control method comprising:

repeating a power generation operation for rotating the second motor/generator using the engine and a motoring operation for rotating the engine using the second motor/generator in accordance with a rise and fall of a charge capacity of the battery upon determining a combustion request has occurred;

continuously applying a prescribed negative torque to the second motor/generator while in the power generation operation such that a transmission torque of the gear train does not continuously fluctuate above and below zero torque;

continuously applying a prescribed positive torque to the second motor/generator while in the motoring operation such that the transmission torque of the gear train does not continuously fluctuate above and below zero torque; and setting a motoring rotational speed and a power generation rotational speed of the engine higher upon detecting the outside air temperature is less than a preset temperature as compared to when the outside air temperature is detected as being greater than or equal to the preset temperature while the power generation operation and the motoring operation are repeated.

2. The hybrid vehicle control method according to claim 1, further comprising executing an engine operation control corresponding to the charge capacity of the battery upon determining that no combustion request has occurred for starting the engine and that at least one of a door and a hood has been left open.

3. The hybrid vehicle control method according to claim 1, further comprising executing an engine operation control in accordance with the charge capacity of the battery upon determining that the engine is in a cold state and the combustion request has occurred for starting the engine.

4. The hybrid vehicle control method according to claim 1, further comprising setting the motoring rotational speed of the engine higher than the power generation rotational speed upon determining that the power generation operation and the motoring operation are repeated as the charge capacity of the battery rises and falls.

5. The hybrid vehicle control method claim 1, further comprising setting the motoring rotational speed of the engine lower than the power generation rotational speed upon determining that the power generation operation and the motoring operation are repeated as the charge capacity of the battery rises and falls.

6. A hybrid vehicle control device for a hybrid vehicle in which a first motor/generator provided as a travel drive source is connected to a drive wheel via a deceleration gear train, and in which an engine and a second motor/generator are directly connected via a gear train having a plurality of gears that are engaged with each other, and in which a battery electrically is connected to the first motor/generator and the second motor/generator, and in which an outside air temperature sensor is configured to detect an outside air temperature, the hybrid vehicle control device comprising:

a controller programmed to control a requested torque of the second motor/generator, and the controller being further programmed to:

repeat a power generation operation for rotating the second motor/generator using the engine and a motoring operation for rotating the engine using the second motor/generator in accordance with a rise and fall of a charge capacity of the battery upon determining a combustion request has occurred;

continuously apply a prescribed negative torque to the second motor/generator while in the power generation operation such that a transmission torque of the gear train does not continuously fluctuate above and below zero torque;

continuously apply a prescribed positive torque to the second motor/generator while in the motoring operation such that the transmission torque of the gear train does not continuously fluctuate above and below zero torque; and set a motoring rotational speed and a power generation rotational speed of the engine higher upon detecting the outside air temperature is less than a preset temperature as compared to when the outside air temperature is detected as being greater than or equal to the preset temperature while the power generation operation and the motoring operation are repeated.

* * * * *